United States Patent
Chen et al.

(10) Patent No.: US 7,845,541 B1
(45) Date of Patent: Dec. 7, 2010

(54) SOLDERING APPARATUS AND SOLDERING METHOD

(75) Inventors: Lu Yang Chen, Taipei Hsien (TW); Yong Zheng, Taipei Hsien (TW); Riguang Cheng, Taipei Hsien (TW); Hua Zhang, Taipei Hsien (TW)

(73) Assignee: Cheng Uei Precision Industry Co., Ltd., Taipei (TW)

( * ) Notice: Subject to any disclaimer, the term of this patent is extended or adjusted under 35 U.S.C. 154(b) by 0 days.

(21) Appl. No.: 12/628,354

(22) Filed: Dec. 1, 2009

(51) Int. Cl.
*B23K 37/00* (2006.01)
*B23K 31/02* (2006.01)

(52) U.S. Cl. .................. 228/41; 228/43; 228/248.1

(58) Field of Classification Search ............... None
See application file for complete search history.

(56) References Cited

U.S. PATENT DOCUMENTS

| | | | |
|---|---|---|---|
| 7,726,546 B2 * | 6/2010 | Maeda | 228/180.22 |
| 2002/0014519 A1 * | 2/2002 | Ozono et al. | 228/248.1 |
| 2004/0142099 A1 * | 7/2004 | Rossmeisl et al. | 427/96 |
| 2006/0124003 A1 * | 6/2006 | Sakaida et al. | 101/123 |
| 2006/0144264 A1 * | 7/2006 | Sakaida et al. | 101/123 |
| 2007/0124922 A1 * | 6/2007 | Kawasumi et al. | 29/739 |
| 2007/0137559 A1 * | 6/2007 | Kimura et al. | 118/256 |
| 2007/0175343 A1 * | 8/2007 | Prince | 101/123 |
| 2007/0262118 A1 * | 11/2007 | Morita et al. | 228/101 |

FOREIGN PATENT DOCUMENTS

| | | | |
|---|---|---|---|
| JP | 05200541 A | * | 8/1993 |
| JP | 05293947 A | * | 11/1993 |
| JP | 2004-306129 A | * | 11/2004 |
| JP | 2006-312304 A | * | 11/2006 |

* cited by examiner

*Primary Examiner*—Kiley Stoner
(74) *Attorney, Agent, or Firm*—WPAT, P.C.; Anthony King

(57) ABSTRACT

A soldering apparatus has a fixture receiving an electronic component and a conducting wire, with a free end of the conducting wire superimposed on the soldering area of the electronic component, a convey mechanism capable of transmitting the fixture downstream, a daubing device, and a soldering device. The daubing device has a level movable element capable of moving along a convey direction of the convey mechanism, and a vertical movable element mounted on the level movable element and capable of moving along an upward and downward direction. A carrier mounted to the vertical movable element has a solder paste can for loading the solder paste, and an output portion for dispensing the solder paste to the soldering area. The soldering device has a soldering head heating the solder paste for shrinking the insulator, with the core wire exposing and connected to the soldering area by the cool solder paste.

11 Claims, 9 Drawing Sheets

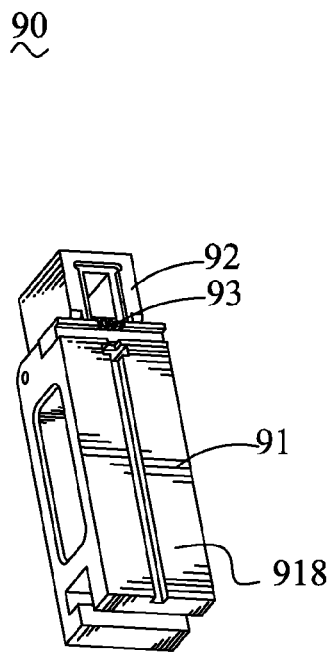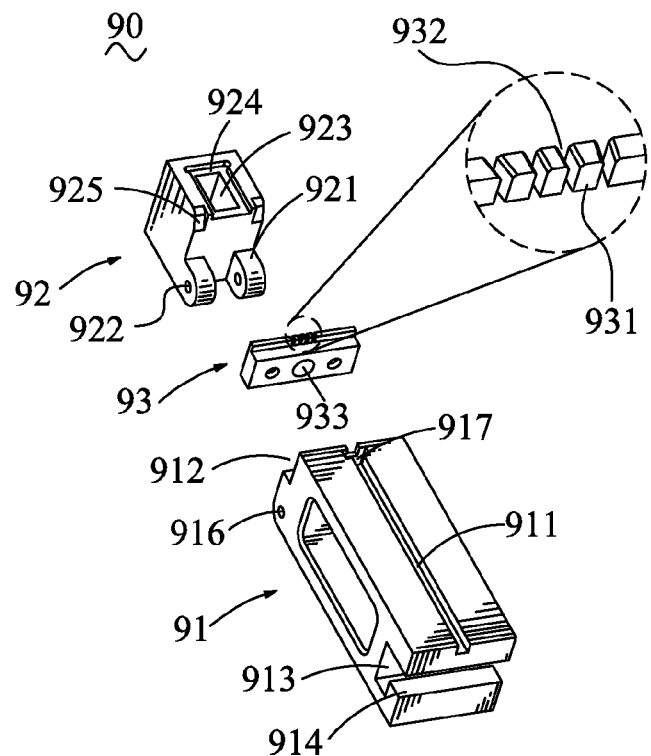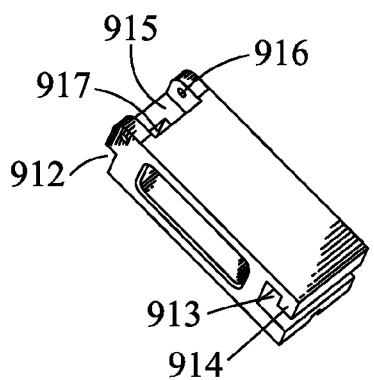
FIG. 2
FIG. 3
FIG. 4

SOLDERING APPARATUS AND SOLDERING METHOD

BACKGROUND OF THE INVENTION

1. Field of the Invention

The present invention relates to a soldering apparatus, and particularly to a soldering apparatus adapted for soldering a conducting wire to an electronic component and a soldering method for the same.

2. The Related Art

The connecting cable, such as high density multichip interconnect (HDMI) cable, universal serial bus (USB) cable and the like, is widely used to electrically connect with two electronic devices for transmitting electrical signals. The connecting cable generally has two electronic components, and a cable having a plurality of conducting wires soldered to corresponding soldering areas of the two electronic components. As the soldering operation for manufacturing the connecting cables, at present, is executed in manual way, the solder wires are usually used as the soldering material for convenient operation. In the process of manually soldering the conducting wires to the electronic components, firstly, the operator has to cut an oxidized end of a core wire of the conducting wire, and then strip an insulator of the free end of the conducting wire for exposing a part of the core wire. The exposed core wire is positioned on the corresponding soldering area of the electronic component and soldered by a soldering device.

However, the efficiency of the manual soldering is lower. Furthermore, since the manual soldering depends on the skill of the operator, the solder quality is instable, affecting the connection property of the connecting cables. In addition, the soldering device for manual soldering has a soldering head, which is easy to be oxidized. Therefore, it is required to maintain the soldering head carefully for prolonging the use time of the soldering device. The solder wires, used as the solder material, lose about 10%-20% in actual application, resulting in great waste.

SUMMARY OF THE INVENTION

Accordingly, an object of the present invention is to provide a soldering apparatus. The soldering apparatus is adapted for soldering a core wire within an insulator of a conducting wire to a soldering area of an electronic component. The soldering apparatus has a fixture for receiving the electronic component and the conducting wire, with a free end of the conducting wire superimposed on the soldering area of the electronic component, a convey mechanism capable of holding and transmitting the fixture downstream, a daubing device disposed at a rear side of the convey mechanism, and a soldering device disposed at the rear side of the convey mechanism and at a downstream end of the daubing device. The daubing device has a level movable element which is capable of moving along a convey direction of the convey mechanism, and a vertical movable element mounted on the level movable element and capable of moving along an upward and downward direction. A carrier mounted to the vertical movable element has a solder paste can for loading the solder paste, and an output portion for dispensing the solder paste to the soldering area of the electronic component where the conducting wire is located, under the drive of the level movable element and the vertical movable element. The soldering device has a soldering head which is capable of heating the solder paste for shrinking the insulator of the conducting wire, with the core wire exposing and connected to the soldering area by the cool solder paste.

Another object of the present invention is to provide a soldering method for soldering a core wire within an insulator of a conducting wire to a soldering area of an electronic component, the soldering method comprises the steps of:

a. mounting the electronic component and the conducting wire to a revolvable element and a stationary element of a fixture, respectively, with a free end of the conducting wire superimposed on the soldering area of the electronic component;

b. pressing the revolvable element to rotate downwards by a separating device for disengaging the revolvable element from the stationary element, leaving the free end of the conducting wire out of the stationary element;

c. cutting a part of the free end of the conducting wire where the core wire is oxidized by a cutting device;

d. pushing the revolvable element to rotate upwards and engage with the stationary element by an assembling device, with the free end of the conducting wire superimposed on the soldering area;

e. dispensing the solder paste to the soldering area of the electronic component by a daubing device;

f. heating the solder paste by a soldering device to shrink the insulator of the conducting wire for exposing the core wire, the core wire connected to the soldering area of the electronic component by the cool solder paste; and g. discharging the electronic component and the conducting wire from the fixture by a discharging device.

As described above, the soldering apparatus provides the daubing device for dispensing the solder paste to the soldering area of the electronic component where the conducting wires are located, and the soldering device for heating the solder paste to make the insulators of the conducting wires shrink so as to expose the core wires. The solder paste cool down and connect the core wires to the soldering area of the electronic component. Such soldering process omits the procedure of striping the insulators from the conducting wires. Therefore, the soldering apparatus simplifies the soldering process. Furthermore, the soldering process for soldering the core wires to the soldering area of the electronic component is automatically carried out by the soldering apparatus, which increases the solder efficiency, improves the solder quality, and economizes the use of the solder paste.

BRIEF DESCRIPTION OF THE DRAWINGS

The present invention will be apparent to those skilled in the art by reading the following description thereof, with reference to the attached drawings, in which:

FIG. 2 is an assembled, perspective view of a fixture of the soldering apparatus shown in FIG. 1;

FIG. 3 is an exploded, perspective view of the fixture of the soldering apparatus shown in FIG. 2;

FIG. 4 is a perspective view of a stationary element of the fixture of the soldering apparatus shown in FIG. 3 seen from another angle;

DETAILED DESCRIPTION OF THE EMBODIMENT

Figure 1:
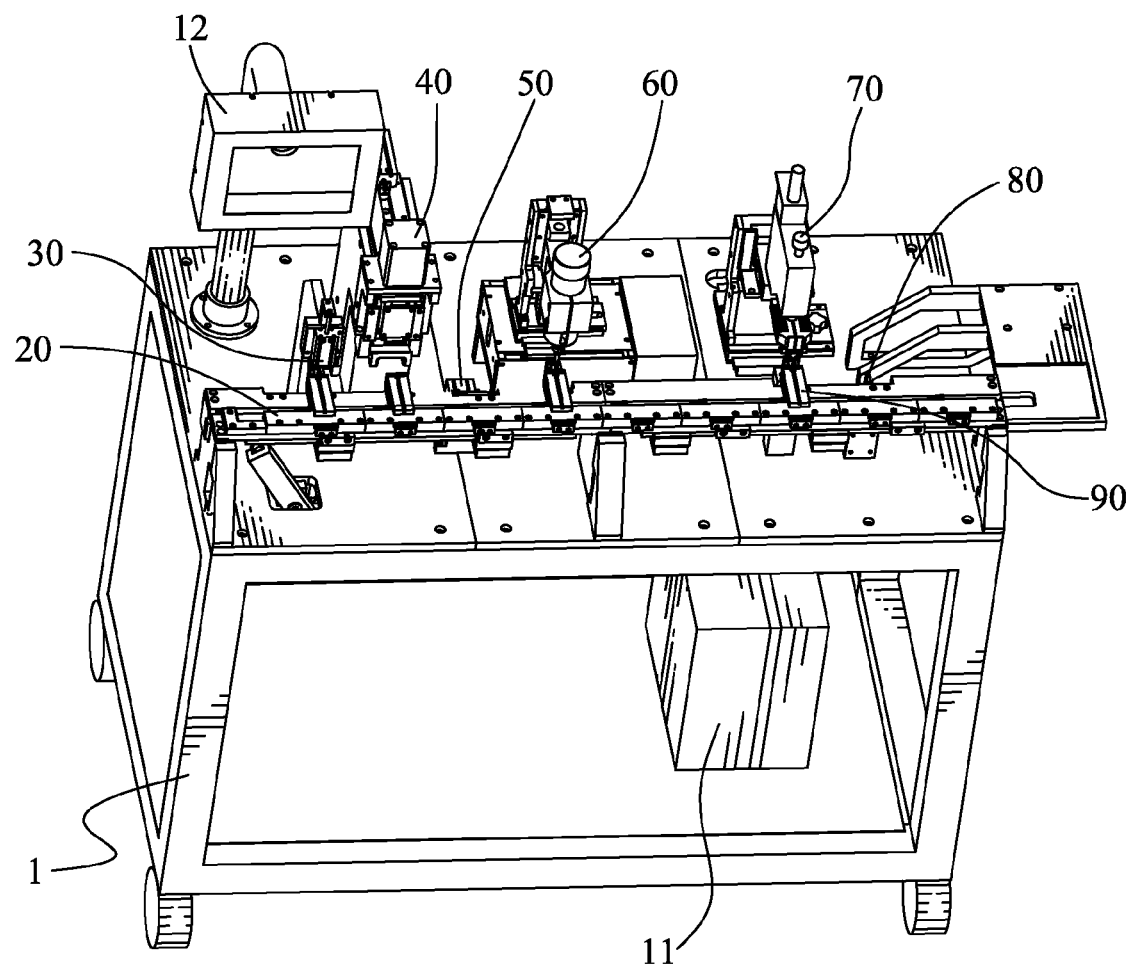
FIG. 1 is an assembled, perspective view of a soldering apparatus of an embodiment in accordance with the present invention.
Figure 5:
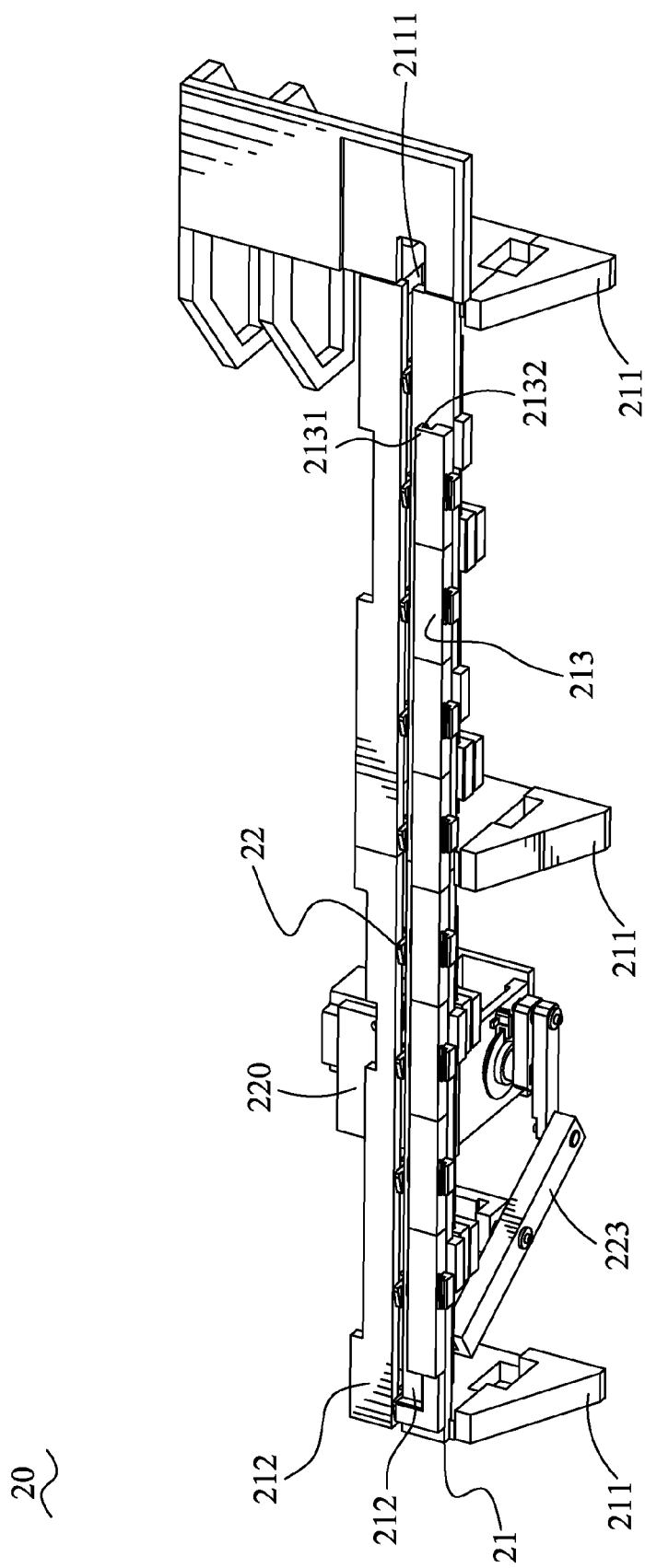
FIG. 5 is an assembled, perspective view of a convey mechanism of the soldering apparatus shown in FIG. 1.
Figure 6:
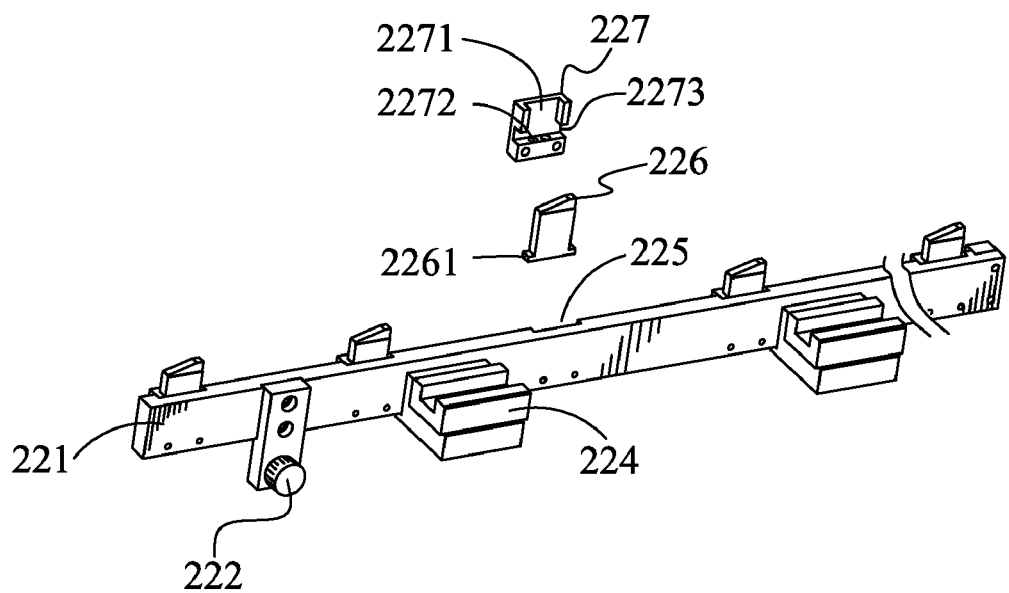
FIG. 6 is an exploded, perspective view of a pushing element of the convey mechanism of the soldering apparatus shown in FIG. 5.

Referring to the drawings in greater detail, and first to FIG. 1 and FIG. 5, the embodiment of the invention is shown in a soldering apparatus. The soldering apparatus has a supporting platform 1, a processing system, and a convey mechanism 2 mounted on the supporting platform 1. The processing system includes a controller 11, an operating panel 12 connected with the controller 11, a plurality of sensors (not shown). The convey mechanism 2 has a convey element 21 and a pushing element 22. A separating device 30, a cutting device 40, an assembling device 50, a daubing device 60, a soldering device 70 and a discharging device 80 are fixed on the supporting platform 1 and arranged at a rear side of the convey element 21 in turn. A plurality of fixtures 90 are slidably mounted to the convey element 21. The sensors are mounted to a bottom of the convey element 21, corresponding to the separating device 30, the cutting device 40, the assembling device 50, the daubing device 60, the soldering device 70 and the discharging device 80, respectively.

With reference to FIGS. 2-4, the fixture 90 is made of metal material and has a stationary element 91, a revolvable element 92 pivoted to the stationary element 91, and a distributing section 93. The stationary element 91 is a rectangular block shape, and defines a top surface 918. A slot 911 is formed at a middle of the top surface 918, and extends frontward and rearward, for receiving a cable (not shown). A front end of the stationary element 91 has a positioning recess 913. The positioning recess 913 passes through the stationary element 91 along a leftward and rightward direction parallel to a convey direction of the convey mechanism 2. A lower side of the positioning recess 913 has a front portion protruded upwards to form a stopping portion 914, spaced away from an upper side of the positioning recess 913. A rear end of the stationary element 91 has a recess 912 at an upper portion thereof and a receiving recess 915 at a lower portion thereof and spaced from the recess 912. The recess 912 reaches the top surface 918 and two lateral surfaces of the stationary element 91, and communicates with the slot 911. The receiving recess 915 reaches a bottom of the stationary element 91, and has two opposite walls formed with two facing first pivot holes 916. A top wall of the receiving recess 915 adjacent to the recess 912 has a first through hole 917 extending upwards to reach the top surface 918 and communicates with the slot 911.

The revolvable element 92 is a block shape and has a fixing recess 924 at a top surface thereof and reaching a front end thereof. The fixing recess 924 is adapted for receiving an electronic component (not shown), with a shape thereof depending on a shape of the electronic component. A bottom of the fixing recess 924 has a second through hole 923 passing through the revolvable element 92. The front end of the revolvable element 92 has a lower portion projected frontward to form two pivot portions 921, received in the receiving recess 915, and two upper corners formed with inclining surfaces, as guiding surfaces 925. Each of the pivot portions 921 has a second pivot hole 922, in alignment with the first pivot holes 916 in assembly. A pivot element (not shown) is provided to pass through the first and second pivot holes 916, 922 for rotatably connecting the stationary element 91 and the revolvable element 92 together.

The distributing section 93 is a rectangular plate shape and fixed in the recess 912. A top of the distributing section 93 has a rear portion protruded upwards to form a rib 931. The rib 931 has a plurality of channels 932 at a middle portion thereof, for respectively receiving conducting wires within the cable. The distributing section 93 further has a trough 933 to receive a magnet (not shown), for attracting the stationary element 91 to engage with the revolvable element 92 firmly.

Please refer to FIGS. 1-2 and FIGS. 5-6, the convey element 21 has a plurality of holders 211 of plate shape. The holders 211 are mounted to the supporting platform 1 side by side, forming a row. A middle portion of a top of each holder 211 has a notch 2111. Two tracks 212 of strip shape are laid on the holders 211 and spaced from each other, with the notches 2111 exposing therebetween. The front track 212 further has a positioning portion 213 of strip shape. The positioning portion 213 has a substantially inverted-L shaped cross-section, with an originated end 2131 extending rearwards. The originated end 2131 has a free end extending downwards to form an inserting portion 2132. The inserting portion 2132 is slidably received in the positioning recess 913 and blocked by the stopping portion 914, thereby the fixture 90 can slide along the tracks 212 and are immovable in the frontward and rearward direction.

The pushing device 22 has a conveying bar 221 and a driving component 220 for driving the conveying bar 221 to move. The conveying bar 221 is disposed between the two tracks 212 and restrained in the notches 2111. An end of the conveying bar 221 adjacent to the separating device 30 has a pivot shaft 222 at a side thereof for pivotally connecting with an end of a pushing bar 223, and the pushing bar 223 has an opposite end connected with the driving component 220, thereby conveying the driving force from the driving component 220 to the conveying bar 221. A rear side of the conveying bar 221 has a plurality of fixing recesses 225. The fixing recesses 225 are spaced away from one another with predetermined distances and pass through a top of the conveying bar 221, for receiving a plurality of pushing slices 226 and corresponding locking covers 227, with tops of the pushing slices 226 exposed outside the tracks 212. The pushing slices 226 are substantially rectangular. A bottom of each pushing slice 226 has two holes (not shown). Lower portions of two opposite sides of the pushing slice 226 are protruded laterally to form two lumps 2261. In this embodiment, the top of the pushing slice is formed with an inclining surface. The locking cover 227 for fixing the pushing slice 226 to the fixing recess 225 has a locking recess 2271 at a side thereof for receiving the pushing slice 226. Lower portions of two opposite sides of the locking recess 2271 have openings 2273 for receiving the lumps 2261. A bottom side of the locking recess 2271 has two holes 2272, aligned with the holes of the pushing slice 226, respectively, for receiving two springs (not shown) therein. A plurality of sliders 224 are provided and fixed to a front side of the conveying bar 221. The sliders 224 are slidably mounted to a bottom of the front track 212, allowing the conveying bar 221 to move along the tracks 212.

Figure 7:
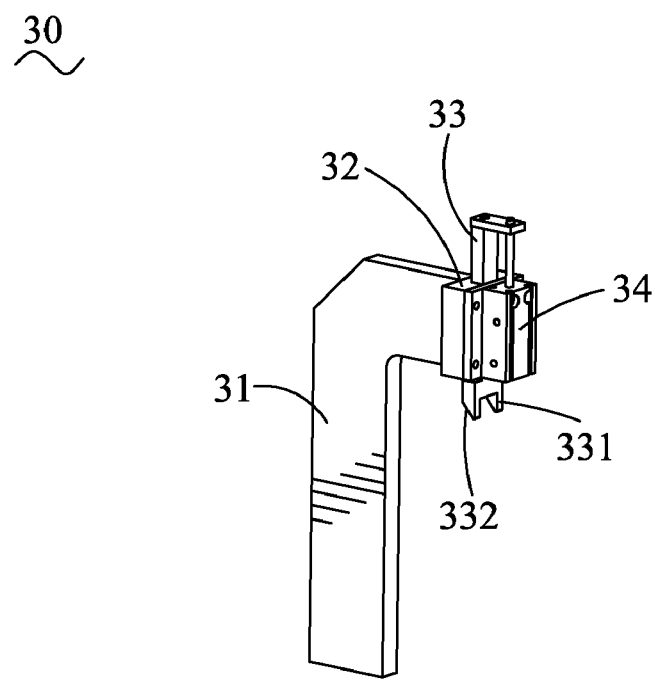
FIG. 7 is a perspective view of a separating device of the soldering apparatus shown in FIG. 1.

Please refer to FIGS. 1-2 and FIG. 7, the separating device 30 has a supporting plate 31, a fixing block 32 mounted at a free end of the supporting plate 31 and suspended over the convey mechanism 20, and a separating element 33 slidably mounted to the fixing block 32. The separating element 33 is driven to move upwards and downwards by a cylinder 34 which is controlled by a system controller (not shown). A bottom of the separating element 33 is protruded downwardly to form two facing separating portions 331 of plate shape. The separating portion 331 has a bottom formed with an inclining surface, designated as a separating surface 332, for interposing between the stationary element 91 and the revolvable element 92 along the guiding surface 925 so that the revolvable element 92 is turned downwards to disengage from the stationary element 91.

Figure 8:
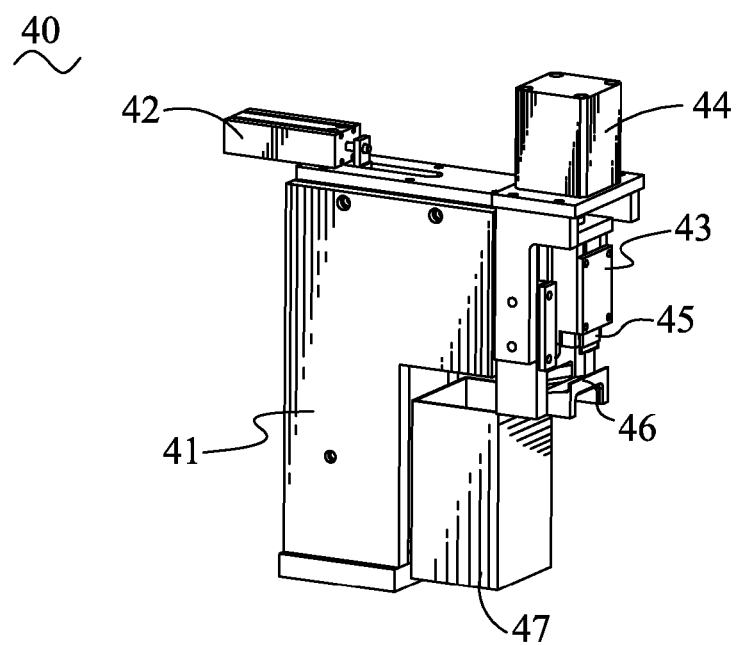
FIG. 8 is a perspective view of a cutting device of the soldering apparatus shown in FIG. 1.

Please refer to FIGS. 1-2 and FIG. 8, the cutting device 40 has a body 41 fixed to the supporting platform 1, a level cylinder 42 disposed on a top of the body 41, and a vertical driving element 43 disposed frontward of the body 41. The level cylinder 42 is able to drive a level driving element (not shown) within the body 41 to move frontward and rearward with respect to the body 41. The vertical driving element 43 is mounted to an upper portion of a front of the level driving element, moving frontward and rearward with the level driving element, and brought to move upwards and downwards by a vertical cylinder 44. A bottom of the vertical driving element 43 is connected with a first cutting blade 45. A second cutting blade 46 is fixed at a lower portion of the front of the level driving element. The second cutting blade 46 is in alignment with the first cutting blade 45 and engages with the movable first cutting blade 45 for cutting conducting wires. The level driving element further has a box 47 at a bottom thereof and rearward of the second cutting blade 46 for receiving waste material cut by the first cutting blade 45 and the second cutting blade 46. The level cylinder 42 and the vertical cylinder 44 are commanded by the system controller.

Figure 9:
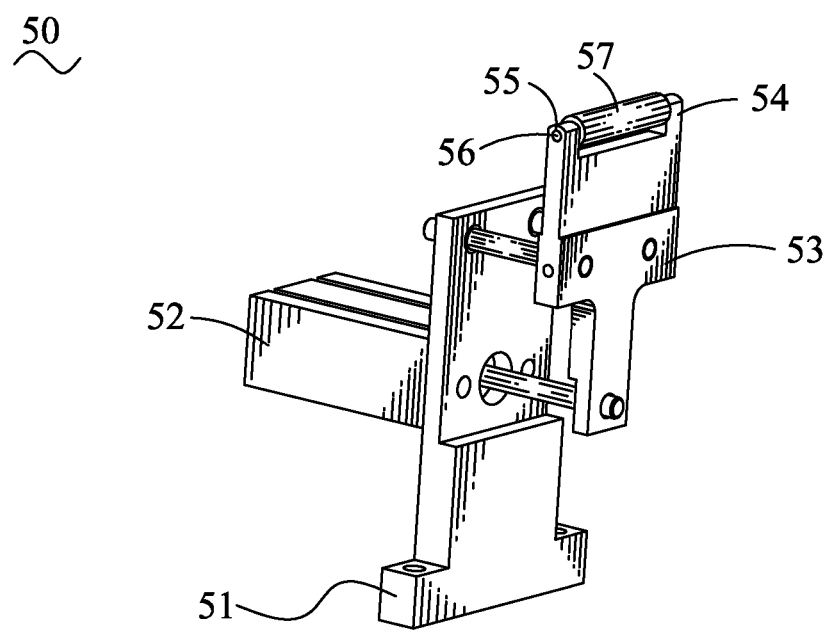
FIG. 9 is a perspective view of an assembling device of the soldering apparatus shown in FIG. 1.
Figure 10:
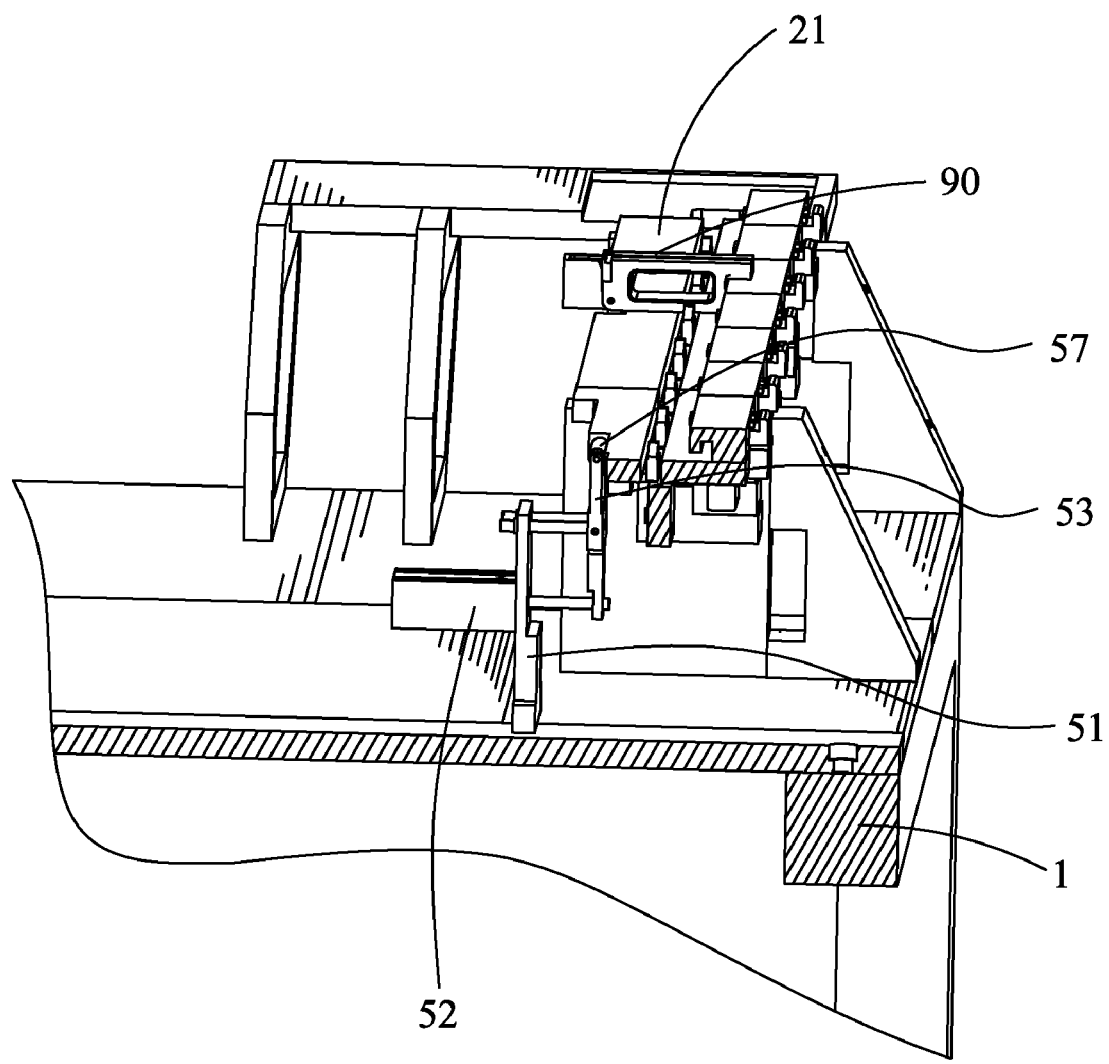
FIG. 10 is a perspective view showing the position of the assembling device located in the soldering apparatus of FIG. 1.

Please refer to FIG. 1 and FIGS. 9-10, the assembling device 50 has a supporter 51 fixed on the supporting platform 1. The supporter 51 of substantially plate shape is located rearward of and below the rear track 212 of the convey mechanism 20. A pushing plate 53 and an assembling cylinder 52 are disposed at a front side and a rear side of the supporter 51. The pushing plate 53 is pivoted to the supporter 51 and underlies the rear track 212. Two ends of a top of the pushing plate 53 are protruded upwards to form two posts 54. Each of the posts 54 has a supporting hole 55. A pivot shaft 56 passes through a tube 57 and is pivoted to the pushing plate 53 by two opposite ends thereof inserting into the supporting holes 55. The tube 57 is substantially flush with a top surface of the rear track 212. The assembling cylinder 52, which is fixed to the supporter 51 and controlled by the system controller, connects with the pushing plate 53 and drives the pushing plate 53 to move frontward and rearwards.

Figure 11:
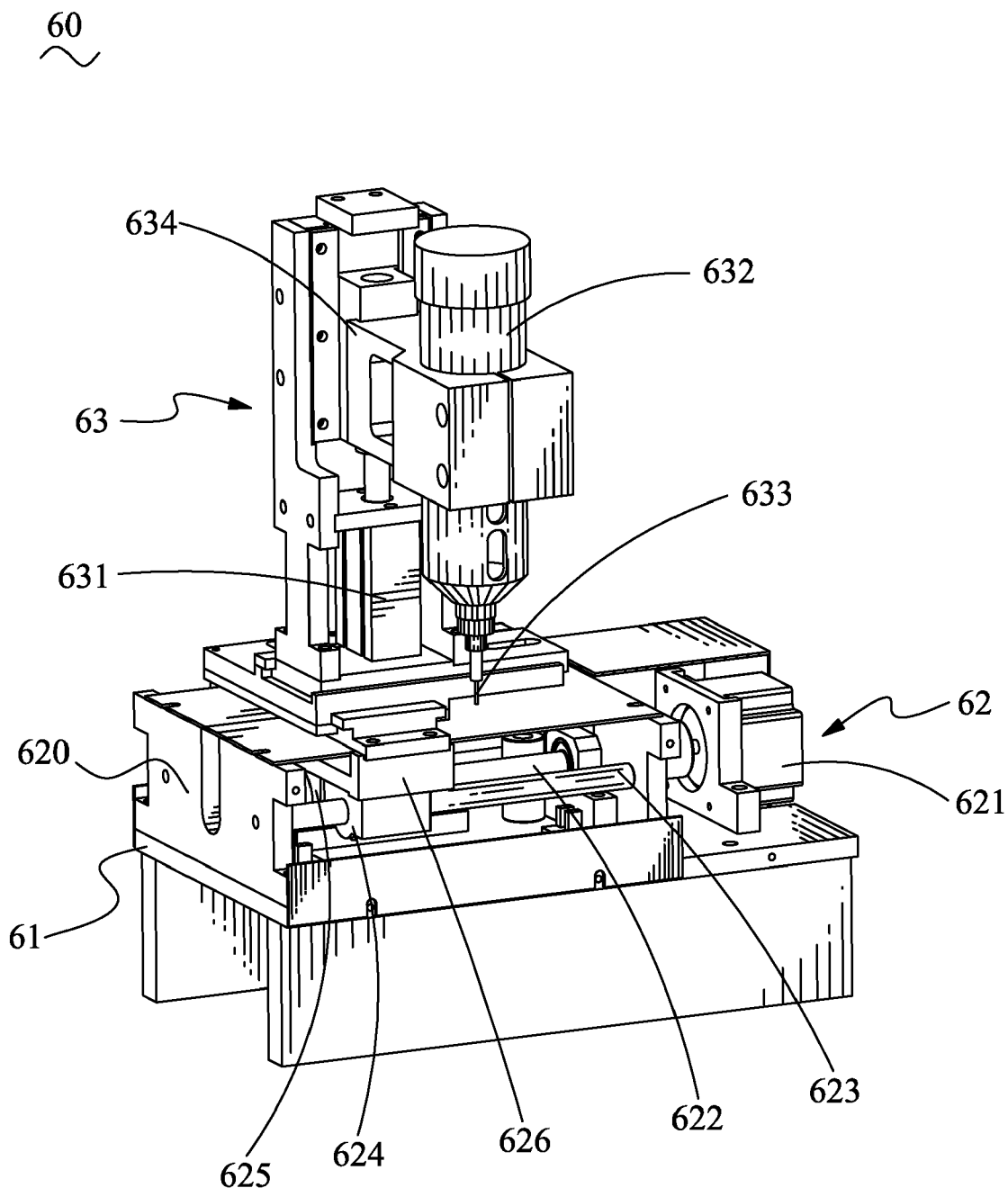
FIG. 11 is a perspective view of a daubing device of the soldering apparatus shown in FIG. 1.

Please refer to FIG. 1 and FIG. 11, the daubing device 60 has a base 61 fixed to the supporting platform 1, a level movable element 62 mounted on the base 61, and a vertical movable element 63 located on the level movable element 62. The level movable element 62 has a motor 621 for providing power, a thread shaft 622 pivoted to a housing 620 and connected with the motor 621, two sliding shafts 623 fixed to the housing 620 and arranged symmetrically about the thread shaft 622, a conveying block 625 mounted to the thread shaft 622 in the way of thread engagement, two sliding blocks 624 slidably mounted to the respective sliding shafts 623, and a sliding plate 626 mounted to the conveying block 625 and the sliding blocks 624. The sliding plate 626 is driven to move along a direction parallel to the convey direction of the convey mechanism 2. The vertical movable element 63 is installed on the sliding plate 626 and has a convey cylinder 631, a carrier 634 which is brought by the convey cylinder 631 to move upwards and downwards, and a solder paste can 632 fixed to the carrier 634 for loading the solder paste. An output portion 633 is connected with a bottom of the solder paste can 632, for dispensing the solder paste to the electronic component. The solder paste can 632 is capable of moving along the direction parallel to the convey direction of the convey mechanism 2 under the drive of the sliding plate 626, and along the upward and downward direction under the drive of the carrier 634. The motor 621 and the convey cylinder 631 are commanded by the system controller.

Figure 12:
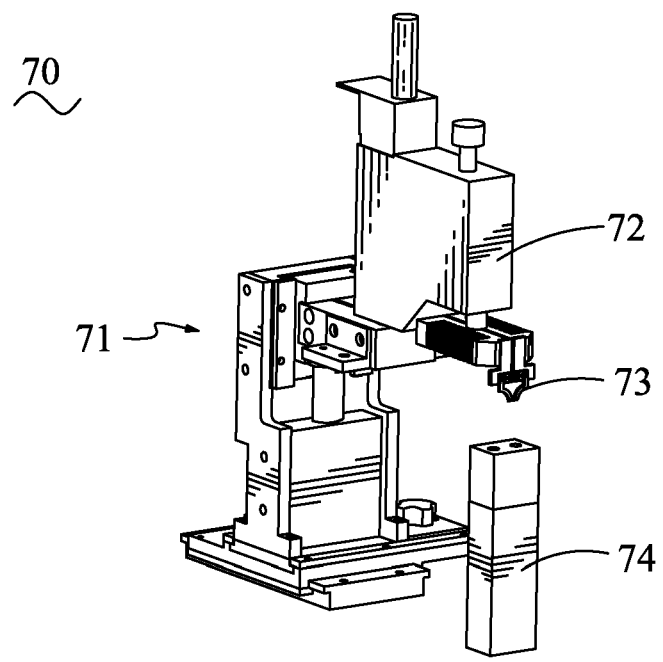
FIG. 12 is a perspective view of a soldering device of the soldering apparatus shown in FIG. 1.
Figure 13:
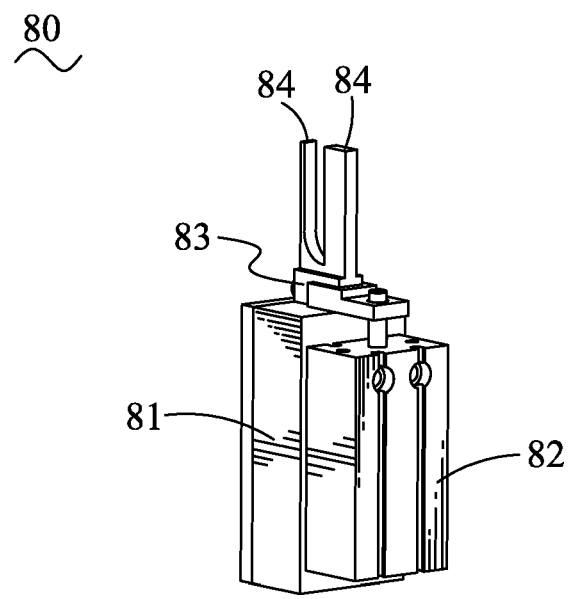
FIG. 13 is a perspective view of a discharging device of the soldering apparatus shown in FIG. 1.
Figure 14:
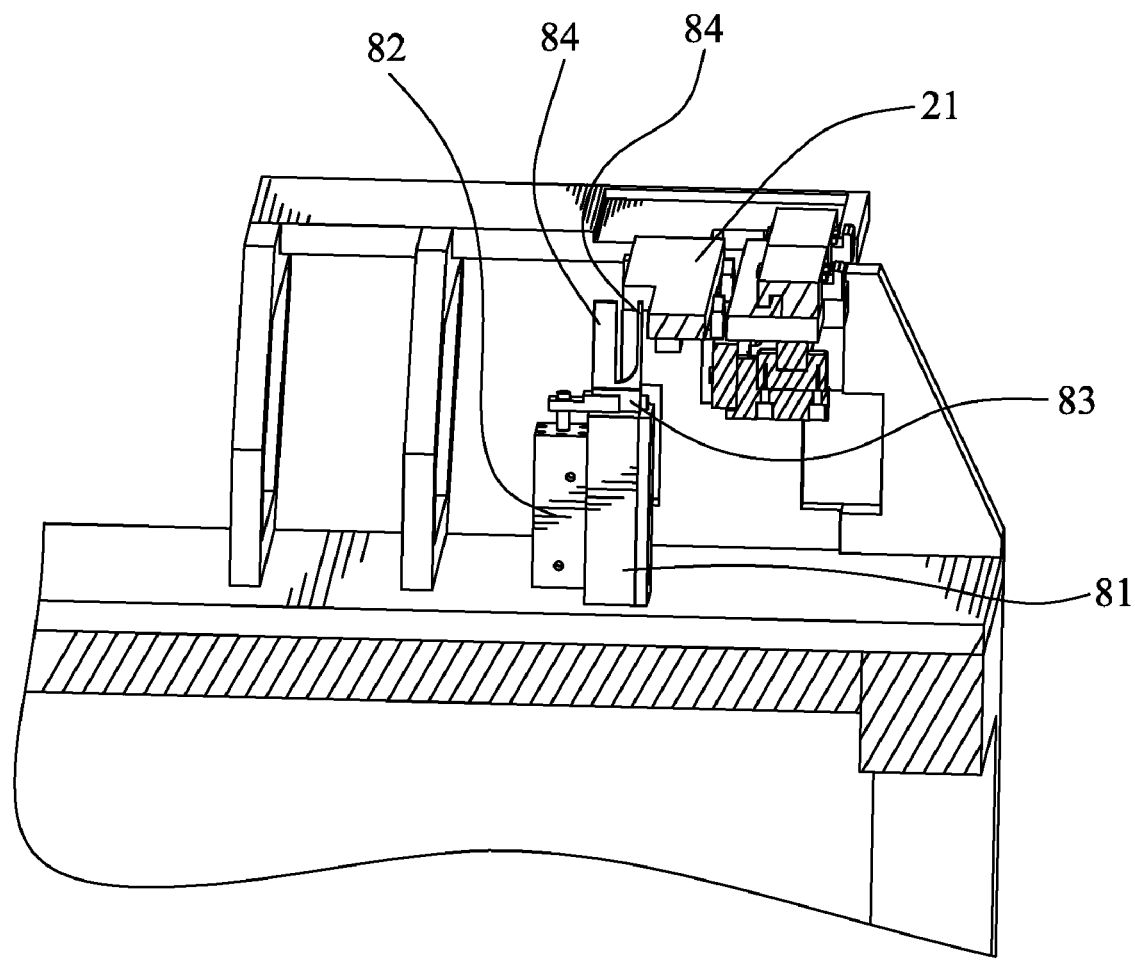
FIG. 14 is a perspective view showing the position of the discharging device located in the soldering apparatus of FIG. 1.

Please refer to FIG. 1 and FIG. 12, the soldering device 70 has an automatic soldering machine 71 mounted to the supporting platform 1. The automatic soldering machine 71 is controlled by the system controller and has a soldering element 72 at a front thereof. The soldering element 72 is capable of moving upwards and downwards with respect to the supporting platform 1. A soldering head 73 is arranged below the soldering element 72 for melting the solder paste to solder core wires of the conducting wires to the electronic component. A supporting block 74 is provided and placed under the soldering head 73 for supporting the soldering fixture 90.

Please refer to FIGS. 1-2 and FIGS. 13-14, the discharging device 80 disposed under the rear track 212 of the convey mechanism 2 has a fixing base 81 mounted to the supporting platform 1, a pushing cylinder 82 fixed to a rear side of the fixing base 81, and an discharging element 83 mounted to a top of the fixing base 81. The pushing cylinder 82 is connected with the system controller for driving the discharging element 83 to move upwards and downwards, with respect to the fixing base 81. The discharging element 83 has two discharging arms 84, in alignment with each other, corresponding to the first and second through holes 917, 923.

When the soldering apparatus is in work, the electronic component and the conducting wires are respectively received in the fixing recess 924 and the slot 911 of the fixture 90. The plural conducting wires are restrained in the respective channels 932 and leave longer free ends thereof superimposed on a soldering area of the electronic component. The fixture 90 is placed on the convey element 21 and in front of the separating device 30, with the revolvable element 92 facing to the separating device 30. The outmost pushing slice 226 of the pushing element 22 is located at an upstream end of the fixture 90 for pushing the fixture 90 to move downstream.

The sensor corresponding to the separating device 30 detects the fixture 90 and sends a signal to the system controller. The system controller controls the separating device 30 to disengage the revolvable element 92 from the stationary element 91. The separating element 33 is brought to move downwards. The revolvable element 92 is restrained between the separating portions 331, and the separating surfaces 332 rest against the guiding surfaces 925. As the revolvable element 92 is pivoted to the stationary element 91, the separating element 33 presses the revolvable element 92 so that the revolvable element 92 is turned downwards to disengage from the stationary element 91, thereby leaving the free ends of the conducting wires exposed outside the distributing section 93. The separated fixture 90 is conveyed downstream by the convey mechanism 20.

The sensor corresponding to the cutting device 40 detects the separated fixture 90 and sends a signal to the system controller. The system controller controls the cutting device 40 to trim the conducting wires. The level cylinder 42 forces the level driving element to move forwards. Correspondingly, the first and second cutting blades 45, 46 are moved forwards until the free ends of the conducting wires are located between the first and second cutting blades 45, 46. The vertical cylinder 44 forces the first cutting blade 45 to move downwards and engages with the second cutting blade 46, thereby trimming the conducting wires. The waste material from the conducting wires drop in the box 47. The fixture 90 is sent downstream by the pushing element 22.

The sensor corresponding to the assembling device 50 detects the sent fixture 90 and sends a signal to the system controller. The assembling cylinder 52 is commanded by the system controller to drive the pushing plate 53 to move rearwards. The tube 57 abuts against and pushes the revolvable element 92 to revolve upwards. The revolvable element 92 is engaged with the stationary element 91 by attracted by the magnet received in the trough 933. The free ends of the conducting wires are regularly laid on the soldering area of the electronic component. The engaged fixture 90 is conveyed downwards by the convey mechanism 20.

The sensor corresponding to the daubing device 60 detects the sent fixture 90 and sends a signal to the system controller. The convey cylinder 631 and the motor 621 are controlled by the system controller to drive the output portion 633 to locate above an end of the soldering area of the electronic component. The solder paste are released from the output portion 633 to uniformly dispense on the soldering area of the electronic component where the conducting wires are located, at the meanwhile, the output portion 633 is brought to move toward an opposite end of the soldering area of the electronic component. Then the fixture 90 is conveyed downstream by the convey mechanism 20.

The fixture 90 is supported by the supporting block 74. The sensor corresponding to the soldering device 70 detects the sent fixture 90 and sends a signal to the system controller. The automatic soldering machine 71 is controlled by the system controller to make the soldering head 73 rest against the solder paste. The soldering head 73 heats the solder paste to melt the solder paste. Insulators of the conducting wires are heated to shrink so that the core wires expose outside. The solder paste cool down and connect the core wires and the soldering area of the electronic device, thereby achieving electrical connection therebetween. Then the fixture 90 is conveyed downstream by the convey mechanism 20.

The sensor corresponding to the discharging device 80 detects the sent fixture 90 and sends a signal to the system controller. The pushing cylinder 82 drives the discharging element 83 to move upwards. The discharging arms 84 are respectively inserted into the first and second through holes 917, 923 for pushing the electronic component and the conducting wires out of the fixture 90. The operator takes the electronic component with the conducting wires soldered thereon away and uses the fixture 90 for the next electronic component and the cable in the same procedure.

When the fixtures 90 are located at every processing positions of the convey mechanism 20, the sensors mounted to the processing positions inform the system controller which can control the separating device 30, the cutting device 40, the assembling device 50, the daubing device 60, the soldering device 70, and the discharging device 80 to execute automatically. Then the convey mechanism 20 is commanded by the system controller to transmit the fixtures 90 toward the next processing positions. In addition, the number and the dimension of the channels can be changed for meeting different demands and should not be limited. The shape of the soldering head of the soldering machine can be adjusted for conforming to different soldered electronic components. The engagement between the stationary element and the revolvable element can also be changed and should not be limited, and correspondingly, the separating device and the assembling device are adjusted appropriately.

As described above, the soldering apparatus provides the daubing device 60 for dispensing the solder paste to the soldering area of the electronic component where the conducting wires are located, and the soldering device 70 for heating the solder paste to make the insulators of the conducting wires shrink so as to expose the core wires. The solder paste cool down and connect the core wires to the soldering area of the electronic component. Such soldering process omits the procedure of striping the insulators from the conducting wires. Therefore, the soldering apparatus simplifies the soldering process. Furthermore, the soldering process for soldering the core wires to the soldering area of the electronic component is automatically carried out by the soldering apparatus, which increases the solder efficiency, improves the solder quality, and economizes the use of the solder paste.

The foregoing description of the present invention has been presented for the purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A soldering apparatus for soldering a core wire within an insulator of a conducting wire to a soldering area of an electronic component, comprising:

a fixture for receiving the electronic component and the conducting wire, with a free end of the conducting wire superimposed on the soldering area of the electronic component;

a convey mechanism capable of holding and transmitting the fixture downstream;

a daubing device disposed at a rear side of the convey mechanism, the daubing device having a level movable element capable of moving along a convey direction of the convey mechanism, and a vertical movable element mounted on the level movable element and capable of moving along an upward and downward direction, a carrier mounted to the vertical movable element having a solder paste can for loading the solder paste, and an output portion for dispensing the solder paste to the soldering area of the electronic component where the conducting wire is located, under the drive of the level movable element and the vertical movable element; and a soldering device disposed at the rear side of the convey mechanism and at a downstream end of the daubing device, the soldering device having a soldering head which is capable of heating the solder paste for shrinking the insulator of the conducting wire, with the core wire exposing and connected to the soldering area by a cool solder paste;

wherein the convey mechanism has a convey element, the convey element has a plurality of holders arranged side by side, and two tracks of strip shape laid on the holders and spaced away from each other, for holding the fixture;

wherein each of the holders has a notch at a middle portion of a top thereof for restraining a convey bar, the convey bar has a plurality of pushing slices extending upwards beyond the tracks and spaced from each other with a predetermined distance, for pushing the fixture downstream.

2. A soldering apparatus for soldering a core wire within an insulator of a conducting wire to a soldering area of an electronic component, comprising:

a fixture for receiving the electronic component and the conducting wire, with a free end of the conducting wire superimposed on the soldering area of the electronic component;

a convey mechanism capable of holding and transmitting the fixture downstream;

a daubing device disposed at a rear side of the convey mechanism, the daubing device having a level movable element capable of moving along a convey direction of the convey mechanism, and a vertical movable element mounted on the level movable element and capable of moving along an upward and downward direction, a carrier mounted to the vertical movable element having a solder paste can for loading the solder paste, and an output portion for dispensing the solder paste to the soldering area of the electronic component where the conducting wire is located, under the drive of the level movable element and the vertical movable element; and a soldering device disposed at the rear side of the convey mechanism and at a downstream end of the daubing device, the soldering device having a soldering head which is capable of heating the solder paste for shrinking the insulator of the conducting wire, with the core wire exposing and connected to the soldering area by a cool solder paste;

wherein the fixture has a stationary element, and a revolvable element rotatably mounted to an end of the stationary element, the revolvable element receives the electronic component, the stationary element receives the conducting wire.

3. The soldering apparatus as claimed in claim 2, wherein a distributing section is disposed between the stationary element and the revolvable element, the distributing section has a trough for receiving a magnet for attracting the stationary element and the revolvable element together.

4. The soldering apparatus as claimed in claim 3, wherein the distributing section has a plurality of channels at a top side thereof, top surfaces of the stationary element and the revolvable element respectively have a slot and a fixing recess, communicating with the channels, the electronic component is received in the fixing recess, the conducting wire is received in the slot, with the free end thereof superimposed on the soldering area of the electronic component through the channel.

5. The soldering apparatus as claimed in claim 4, further comprising a discharging device disposed at a downstream end of the soldering device, the discharging device having two discharging arms extending upwards and inserted into a first through hole of the stationary element and a second through hole of the revolvable element which extend upward and downward and pass through bottoms of the slot and the fixing recess, respectively, for pushing the electronic component and the conducting wire out of the slot and the fixing recess.

6. The soldering apparatus as claimed in claim 2, further comprising a separating device disposed at the rear side of the convey mechanism and at an upstream end of the daubing device, the separating device capable of pressing the revolvable element to rotate downwardly for disengaging from the stationary element.

7. The soldering apparatus as claimed in claim 6, further comprising a cutting device disposed at the rear side of the convey mechanism and between the separating device and the daubing device, the cutting device capable of cutting off a part of the free end of the conducting wire where the core wire is oxidized.

8. The soldering apparatus as claimed in claim 7, further comprising an assembling device disposed between the cutting device and the daubing device, the assembling device capable of pushing the revolvable element to return and engage with the stationary element, with the free end of the conducting wire superimposed on the soldering area of the electronic component.

9. The soldering apparatus as claimed in claim 8, wherein the assembling device has a pushing plate and an assembling cylinder connected with the pushing plate, the pushing plate is controlled by the assembling cylinder to move frontward and rearwards to push the revolvable element to rotate upwards and return the original position.

10. The soldering apparatus as claimed in claim 9, wherein two ends of a top of the pushing plate are protruded upwards to form two posts, each of the posts has a supporting hole, a pivot shaft passes through a tube and is pivoted to the pushing plate by two opposite ends thereof inserting into the supporting holes.

11. The soldering apparatus as claimed in claim 6, wherein the revolvable element has two upper corners adjacent to the stationary element formed with inclining surfaces, as guiding surfaces, the separating device has two facing separating portions of plate shape, each of the separating portions has a bottom formed with an inclining surface, as separating surface, for interposing between the stationary element and the revolvable element along the guiding surface so that the revolvable element is pressed to turn downwards to disengage from the stationary element.

\* \* \* \* \*